April 5, 1927.  W. G. BENT  1,623,522
COATED PAPER
Filed July 14, 1925
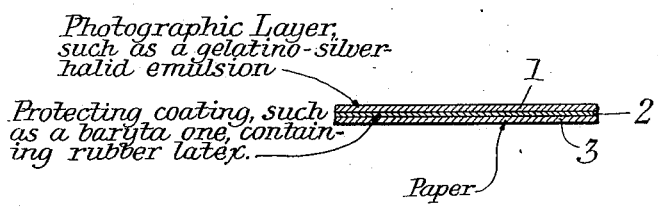
INVENTOR.
Walter G. Bent,
BY
ATTORNEY Patented Apr. 5, 1927.

1,623,522

UNITED STATES PATENT OFFICE.

WALTER G. BENT, OF HARROW, ENGLAND, ASSIGNOR TO EASTMAN KODAK COMPANY, OF ROCHESTER, NEW YORK, A CORPORATION OF NEW YORK.

COATED PAPER.

Application filed July 14, 1925, Serial No. 43,533, and in Great Britain January 20, 1925.

This invention relates to coated paper. One object of the invention is to provide coated paper in which the coating will be of negligible permeability to impurities. Another object of the invention is to render the paper resistant to the action of water. Still another object of the invention is to provide a paper with a coating adapted to receive a photographic layer, such as a gelatino-silver-halid emulsion for instance, said coating isolating said layer from the paper and protecting it from the chemical action of impurities in the paper. Still another object of the invention is to provide a paper having a light reflecting coating, such as the well known baryta coating, for example, which is improved by the addition of an ingredient which renders it less liable to cracking and less liable to crack any photographic layers mounted thereon, and which also renders the coating less permeable to chemical impurities, and further diminishes distortion or damage while the paper is undergoing the usual treatment.

In the accompanying drawing the single figure is a diagrammatic view upon an exaggerated scale of a coated paper embodying my invention.

While my invention is of general applicability in several arts, it finds its principal present usefulness in the photographic art, and I shall, therefore, describe examples of it, as applied to photographic paper.

Such paper is customarily coated with a layer of pigment, usually white, like baryta, and held by a binder, such as gelatin. On this coating is usually deposited a photographic layer such as a gelatino-silver-halid emulsion. There is sometimes a tendency for this coating to become cracked and to crack the emulsion which is supported upon it. Sometimes the paper contains chemicals which are harmful to the photographic layer when the paper is kept over considerable periods, and the ordinary baryta layer only partially protects the emulsion from such impurities.

I have found that these and other difficulties can be counteracted to a highly useful extent by incorporating a rubber emulsion in the coating. While artificial emulsions of rubber may be employed, I prefer to use the natural rubber latex, either in its natural concentration or after it has been artificially concentrated.

In the preferred form of my invention I prepare the coating composition by making up the following mixtures:

A. 1000 pounds (or 454 kilograms) of barium sulfate pigment, known as blanc fixe or barytes, in paste form, containing about 25% of water is mixed with 25 gallons (or 114 liters) of water.

B. 50 pounds (or 23 kilograms) of gelatin are dissolved in 30 gallons (or 136 liters) of water.

Five hundred pounds (or 227 kilograms) of the "A" mixture is then mixed with the whole of the "B" mixture and 2.6 pints (or 1.5 liters) of a saturated solution of alum is slowly stirred into the composition. Finally rubber latex containing say 35 to 40% of non-volatile constituents (mostly rubber) is added in the proportion of half a gallon of latex, to each 640 pounds (or 290 kilograms) of the mixture. It will be understood that rubber latex is miscible with the other ingredients even when they contain preponderant proportions of water, because said latex is an emulsion of rubber droplets in water. In this respect it differs markedly from rubber solutions in organic solvents, which would be wholly immiscible with the aqueous solutions recited above.

The mixture is applied to the surface of the paper to be treated by brushing or dipping or any other well known paper coating system. Where it is desired to increase the thickness of the coating the composition may be applied two or more times in succession. It is preferable to calender the coating, after it is suitably set. In fact, where the composition is applied by successive applications, each coat may advantageously be calendered during the building up of the thicker layer. Obviously the coating may be colored if desired with mineral pigments, flakes, or dyes to supplement the Baryta or modify the effect of the latter.

The paper thus coated may be used by itself for certain purposes, but preferably it is used or sold as a blank in the process of manufacturing a photographic paper. For example, coated paper, produced as above described, may be coated with a photographic layer such as a gelatino-silverhalid emulsion of any well known type. The application of the emulsion to the coated paper can follow the customary practice.

The final paper has improved keeping qualities by reason of the isolation of the sensitive photographic layer from the paper. By reason of the fact that the baryta-latex coating possesses increased flexibility, the photographic paper is unlikely to be injured by cracks forming in the baryta coating and then spreading to the photographic layer. Photographic paper prepared in this way is less liable to distortion and damage while undergoing the usual photographic treatments in aqueous baths.

In the accompanying drawing the photographic layer 1 is supported on coating 2 containing the pigment and latex, said coating being in turn supported by the paper base 3.

Having thus described my invention, what I claim as new and desire to secure by Letters Patent is:

1. As an article of manufacture, a coated paper, the coating thereof including at least a layer of pigment, binder and rubber emulsion.

2. As an article of manufacture, a coated paper, the coating thereof including at least a layer of mineral pigment, binder, and rubber latex.

3. As an article of manufacture, a coated paper, the coating thereof including at least a calendered layer of white mineral pigment, a substantially colorless binder, and rubber latex.

4. As an article of manufacture, a coated paper, the coating thereof including at least a calendered layer which comprises, baryta, a gelatinous binder, and rubber latex.

5. A photographic paper comprising a photographic layer and a paper support which are separated from each other by a coating of pigment, binder, and rubber emulsion.

6. A photographic paper comprising a light sensitive colloid layer, and a paper support which are separated from each other by a layer of low permeability comprising mineral pigment, binder and rubber latex.

7. A photographic paper, comprising a support of paper, an adherent coating thereon containing a white mineral pigment, a substantially colorless binder, and rubber latex, and an adherent photographic layer on said coating.

8. A photographic paper, comprising a support of paper, an adherent coating thereon containing baryta, a gelatinous binder, and rubber latex and an adherent gelatino-silver-halid emulsion on said coating.

Signed at Harrow, Middlesex, England, this 30th day of June, 1925.

WALTER G. BENT.